Patented Apr. 19, 1932

1,855,017

UNITED STATES PATENT OFFICE

LEON W. GELLER, OF SYRACUSE, NEW YORK, ASSIGNOR TO AMERICAN CHICLE COMPANY, OF LONG ISLAND CITY, NEW YORK, A CORPORATION OF NEW YORK

CHEWING GUM BASE

No Drawing.    Application filed October 2, 1928. Serial No. 309,897.

The object of the present invention is to provide a novel chewing gum base composition enabling the employment of relatively large proportions of fats or fatty acid-soaps with rubber in such manner that high proportions thereof, as for example the stearates, may be employed without disintegrating effect upon the rubber. The rubber is preferably depolymerized prior to its admixture with the fats or fatty acid-soaps and with the mixture is incorporated chlorparaffin resin, and, if desired, the depolymerization of the rubber may be effected by treatment with the chlorparaffin resin.

It has heretofore been proposed in the art to subject rubber, stearin, Japan wax, paraffin or other oils and fats to heat so as to break down the resiliency of the rubber with the object of making a chewing gum base, but the base is unstable and disintegrates owing to the attack upon the rubber by the fats, fatty acids or waxes employed. By my invention stearin, calcium or magnesium stearate, etc., may be successfully employed even in excess of the rubber.

As an example of my invention, I take 6 parts of stearin, 6 parts of calcium or magnesium stearate and 6 parts of chlorparaffin resin and heat the same together, while under stirring, for a period of use until a homogeneous soft mass is formed. The mixture is permitted to stand, as for example overnight, and is then re-heated and to the melted mixture is added 8 parts of depolymerized rubber. The rubber readily dissolves in the mixture after heating, as by a steam bath. The batch is then cooled and kneaded until it becomes a homogeneous mass.

The quantity of calcium or magnesium stearate may be reduced by substituting therefor a proportion of hard chlorparaffin resin, the resin specified in the example being "soft", that is to say a resin in which the chlorine treatment of the paraffin has been stopped when the resin assumes a thick but somewhat fluid form, as distinguished from the hard resin in which chlorination has been continued until the resin at ordinary temperatures has somewhat the physical characteristics of pine rosin. The calcium or magnesium stearate tends to harden the mixture.

The rubber may be depolymerized with carnauba wax, or depolymerization may be effected with chlorparaffin resin, by subjecting the mixed rubber and resin or wax to heat, as for example a temperature of about 120° C. for a period of time sufficient to effect the depolymerization.

As a further example, I may take 2 parts of stearin, 3½ parts of soft chlorparaffin resin and 8 parts of depolymerized rubber, with a small proportion, say ½ part, of carnauba wax. The stearin is melted to a clear solution under a steam bath, together with the chlorparaffin resin, and to this melted mixture is added the depolymerized rubber. The mixture is further heated for a number of hours, say five or six hours, is cooled, permitted to stand, and is re-heated, after which operation the rubber will go into solution. The mass is then cooled and mixed or kneaded, forming mixture No. 1. Mixture No. 2 is prepared by heating 4 parts of stearin, together with 2½ parts of soft chlorparaffin resin until the two are melted. To this is added 6 parts of calcium stearate or magnesium stearate and heating of the batch is continued, under stirring, until a soft homogeneous mass is formed. The mixture is then cooled. Both mixtures may be heated and to the mixture No. 1 may be added the melted mixture No. 2 of fats, fatty acid-soaps and chlorparaffin resins. The mixing is readily effected and the base produced has the same general physical properties as a chicle base and is stable.

The above examples may be widely varied in accordance with the specific physical characteristics of the base required.

A further specific example, for a soft chewing gum base, is stearin 7 parts, chlorparaffin soft resin 5 parts, magnesium stearate or calcium stearate 6 parts and depolymerized rubber 7 parts. To the rubber may be added a small proportion of carnauba wax.

Having described my invention what I claim and desire to secure by Letters Patent is as follows:—

1. A chewing gum base comprising fat, depolymerized rubber and chlorparaffin resin, the chlor-paraffin resin being not less than 30% of the depolymerized rubber as to volume.

2. A chewing gum base comprising fat, fatty acid metallic soap, chlorparaffin resin and depolymerized rubber, the metalic soap and chlor-paraffin resin being approximately equal in volume.

3. A chewing gum base comprising fat, fatty acid metallic soap and chlorparaffin resin, resin and soap being approximately equal in volume.

4. A chewing gum base comprising fat, fatty acid, chlorparaffin resin and rubber, the rubber being exceeded in volume by the remaining ingredients and the fatty acid and resin being approximately equal in volume.

5. A chewing gum base comprising fat, chlorparaffin resin, and coagulated, depolymerized latex, the latex being in excess of the rubber as to volume.

In testimony whereof, I have signed my name to the specification.

LEON W. GELLER.